US006775694B1

(12) United States Patent
Fougerat (10) Patent No.: US 6,775,694 B1
(45) Date of Patent: Aug. 10, 2004

(54) METHOD FOR GENERATING FILTERS DESIGNED TO AVOID RISKS OF BREACH IN INTERCONNECTED COMPUTER NETWORKS

(75) Inventor: Jerome Fougerat, Paris (FR)

(73) Assignee: Solsoft, Levallois-Perret (FR)

( * ) Notice: Subject to any disclaimer, the term of this patent is extended or adjusted under 35 U.S.C. 154(b) by 0 days.

(21) Appl. No.: 09/529,400

(22) PCT Filed: Oct. 15, 1998

(86) PCT No.: PCT/FR98/02218

§ 371 (c)(1),
(2), (4) Date: Jun. 1, 2000

(87) PCT Pub. No.: WO99/21335

PCT Pub. Date: Apr. 29, 1999

(30) Foreign Application Priority Data

Oct. 16, 1997 (FR) .............................. 97 13254

(51) Int. Cl.[7] .............................. G06F 15/16
(52) U.S. Cl. .................. 709/218; 709/217; 709/238; 709/239; 345/734; 345/735; 345/736; 345/853; 345/968; 715/502
(58) Field of Search ................ 709/223, 224, 709/201–203, 238–239, 217–218; 345/734–736, 853, 968; 715/502

(56) References Cited

PUBLICATIONS

Heydon, Allan; Maimone, Mark; Tygar, J.D.; Jeanette; Zaremski, Amy Moormann; *Miro: Visual Specification of Security;* vol. 16, No. 10, Oct. 1990; p. 1185–1197.

Bellovin, Steven; Cheswick; William; *Network Firewalls;* IEEE Communications Magazine, 32 (1994) Sep., No. 9, p. 50–57.

Bachman, David; Segal, Mark; Srinivasan, Mandyam; Teorey, Toby; *The Network Modeling Tool: A Design Aid for Large–Scale Campus Networks;* IEEE (1990) p. 560–567.

*Primary Examiner*—Jack B. Harvey
*Assistant Examiner*—Hieu Le
(74) *Attorney, Agent, or Firm*—Merchant & Gould P.C.

(57) ABSTRACT

The invention concerns the field of interconnected computer networks, consisting in a system for generating in a simple and automatic way filters, according to the internet protocol, designed to avoid the risk of breach in interconnected computer networks. A computer terminal and control means interact iteratively with a graphic interface so as to: generate and display the objects and classes requiring security; select and display the application protocols for which filters need to be generated; draw on the graphic interface, by means of arrow curves for each application protocol previously selected, the communication laws. The terminal comprises computing means for converting the graphic data representing the communication laws into programming data for the screening routers.

6 Claims, 7 Drawing Sheets

METHOD FOR GENERATING FILTERS DESIGNED TO AVOID RISKS OF BREACH IN INTERCONNECTED COMPUTER NETWORKS

TECHNICAL FIELD

The field of the invention is that of interconnected computer networks.

BACKGROUND

The openness of computer networks according to the internet protocol affords many opportunities. However, it also implies a share of hazards, network intrusion risks, protection problems. There is hardware and software available for performing packet filtering using the internet protocol. However, controlling this filtering for the application of demanding security policies is difficult and complicated.

The invention relates to a method of simply and automatically generating filters, using the internet protocol, intended to avoid the risks of intrusion of interconnected computer networks.

The terms that will be used hereafter to outline the technical solution according to the invention are defined as follows:

"network" designates one or more closed address spaces (according to the topological meaning of the term) of the internet protocol.

"Objects" designate a network's component. Thus, without this enumeration being exhaustive, objects as understood by this invention are: computers, computer equipment, servers, printers, (physical or logical) networks, (physical or logical) sub-networks, filter equipment, fire-walls, users or user groups, computer applications. An object is characterized by its type and name. E.g., a filtering router is an object type, just like a set of networks is an object type. An object has one or several addresses or one or several closed address spaces.

A "protocol" designates a convention stating the rules and technical specifications to follow in the telecommunication field in order to provide object interoperability.

A "communication protocol" designates a protocol, such as for instance the internet protocol, defining a data transfer technique.

An "application protocol" or "service" designates a protocol defining a data or command exchange technique for a given application.

A "class" designates all addresses having the same laws of communication. A class can gather other classes. Classes are objects as understood by the present specification of the invention.

A "law of communication" designates a law, which, for the application protocol involved, enables or disables communication between a pair of objects, a pair of classes or a mixed (class, object) pair.

A "security domain" designates a set of interconnected objects to which apply the laws of communication peculiar to each object of else generic ones.

A "link" or "connection" designates physical connections (e.g. network cables) linking objects together. A network is a set of interconnected objects.

A "router" designates equipment enabling the interconnection of separate objects.

A "filter" designates the technical means allowing to implement the laws of communication. E.g., programming a router allows to control the possibility of communicating between two separate networks. By extension, a filtering router designates an equipment enabling internet protocol filtering.

The objectives this invention aims at, i.e. simply and automatically generating filters intended to avoid the risks of intrusion of interconnected computer networks, are achieved through a method consisting in iteratively using a graphical interface for:

creating and viewing objects and classes of the security domain, selecting and viewing the application protocols for which filters are to be created, drawing at the graphical interface, by means of arrow curves, the laws of communication for each previously selected application protocol.

Drawing such arrow curves representing the laws of communication makes it possible to create simultaneously and instantly the creation of filters associated with the filtering routers and applicable to the objects involved. Therefore, and according to a further step of the method:

the graphical data representing the laws of communication are converted into programming data of the filtering routers.

The inventive method allows the graphical interface to be used for viewing the security policy of the security domain and modifying it if required. Preferably, the laws of communication between objects or classes are modified at the graphical interface by selecting predetermined application protocols.

This invention also relates to a system for simply and automatically generating filters, according to the internet protocol, intended to avoid the risks of intrusion of interconnected computer networks. Said system consists in using a graphical interface associated with a computing terminal and control means interacting with the graphical interface, for:

creating and viewing objects and classes of the security domain, selecting and viewing the application protocols for which filters are to be created, drawing at the graphical interface, by means of arrow curves, the laws of communication for each previously selected application protocol.

Drawing such arrow curves representing the laws of communication makes it possible to create simultaneously and instantly the creation of filters associated with the filtering routers and applicable to the objects involved. Therefore, and according to a further step of the method:

the graphical data representing the laws of communication are converted into programming data of the filtering routers.

The inventive method allows the graphical interface to be used for viewing the security policy of the security domain and modifying it if required. Preferably, for the modification of the laws of communication between objects or classes at the graphical interface, the control means comprises means for selecting predetermined application protocols.

DESCRIPTION OF THE DRAWINGS

Other features and advantages of the invention will become apparent from reading the description of alternatives of the invention, provided by way of example and not to be restrictive, and the drawings wherein.

DETAILED DESCRIPTION

Figure 1:
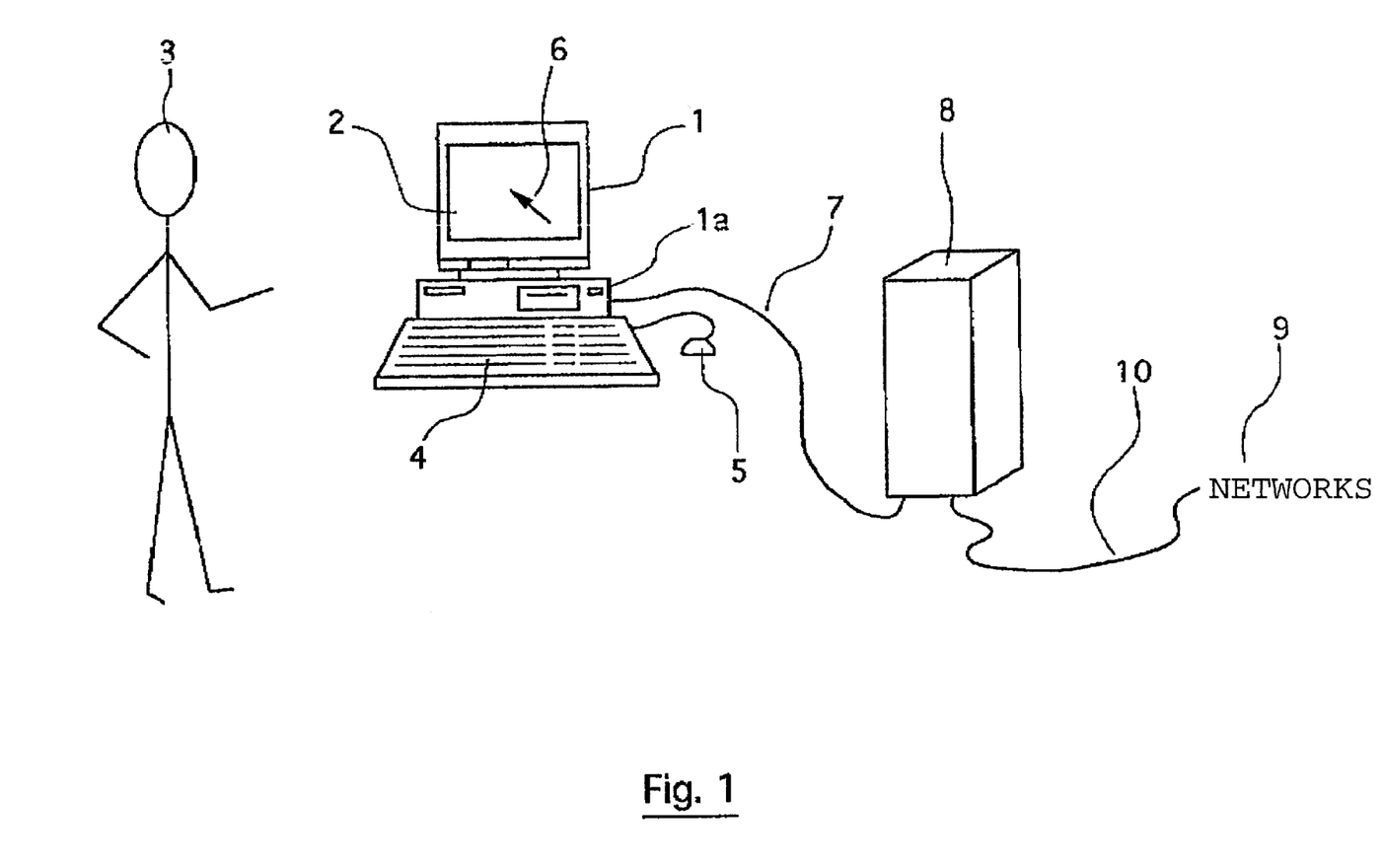
FIG. 1 shows a schematic perspective view of the inventive system.

We are now going to describe FIG. 1, which shows a schematic perspective view of the inventive system.

The computing terminal 1 includes a viewing screen 2, also called graphical interface. The terminal is controlled by the user 3 by means of a keyboard 4 and a control box 5 (a mouse). These control members conventionally allow to move a cursor 6 on viewing screen 2. The computing terminal is interconnected through a cable link 7 with at least one programmable filtering router 8. This router is in turn interconnected with networks 9 via links 10.

Figure 2:
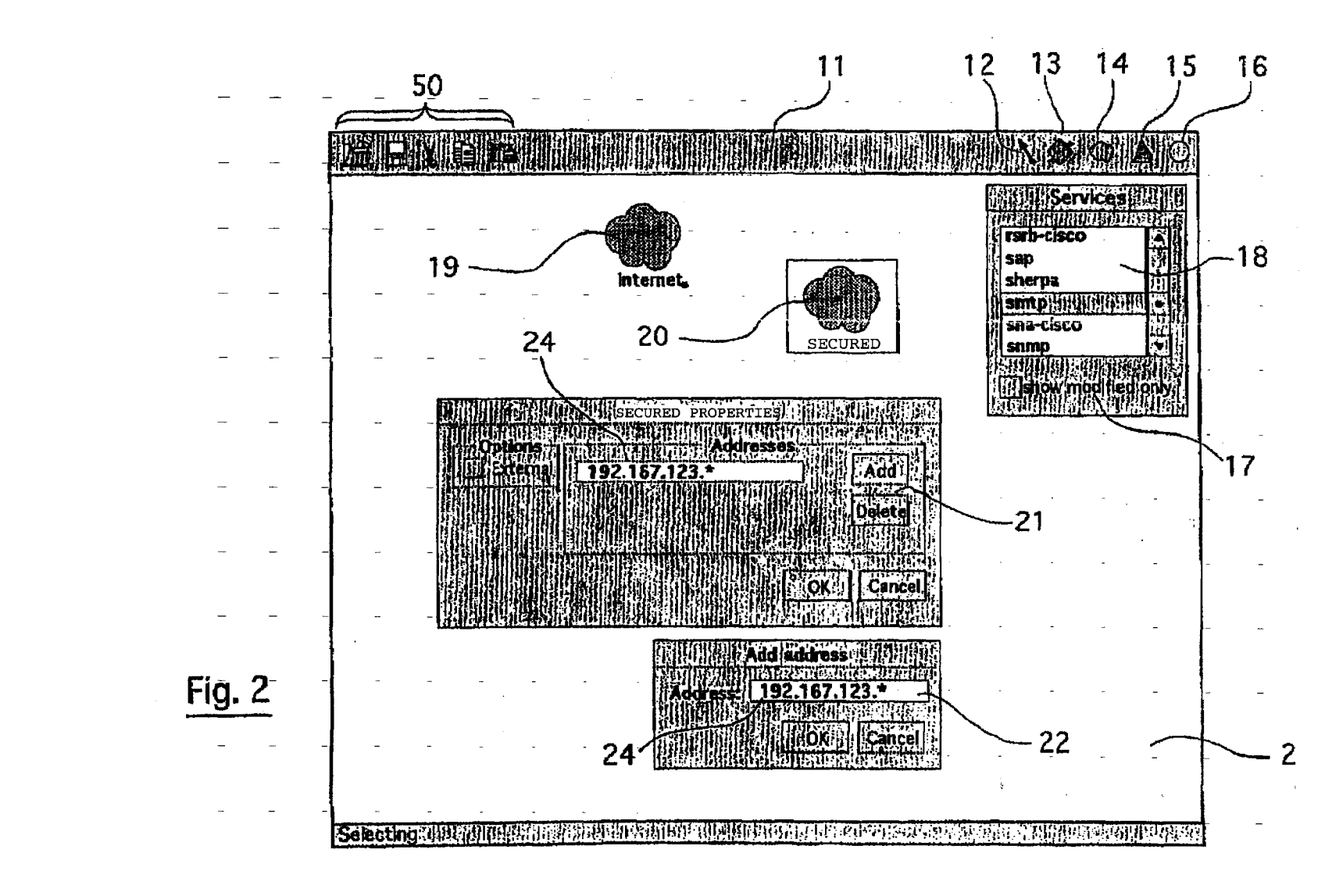
FIG. 2 shows the viewing screen during the phase of creating objects, and more in particular security domain networks.

We are now going to describe FIG. 2, which shows the viewing screen during the phase of creating objects, and more in particular security domain networks.

The right-hand part of the tool bar 11 of viewing screen 2 has five icons: selection 12, filtering router 13, network 14, class 15, law of communication 16, the functions of which will be described hereafter. To the left of the tool bar 11, there are icons 50: file, edit, cut, paste. Conventionally, these tools, when they are selected or activated by the cursor 6, which is operated by control box 5, allow to open files, save the graphical interface, cut or paste parts thereof.

An open window 17 includes the list of services 18, also called application protocols in the specification.

In order to create the graphical representation of a network at the graphical interface 2, the user uses the mouse 5 to activate icon 14 by means of cursor 6. The graphical network representations appear on viewing screen 2 in cloud shape 19, 20, etc. By means of selection tool 12, the user can select, move and arrange the networks to his liking. In the example shown, network 20, labeled "secured", has been selected. By operating control box 5, the user can open dialog windows 21, 22 on screen 2, in order to input network properties, in particular addresses 24. The user proceeds iteratively to create the remaining networks.

Figure 3:
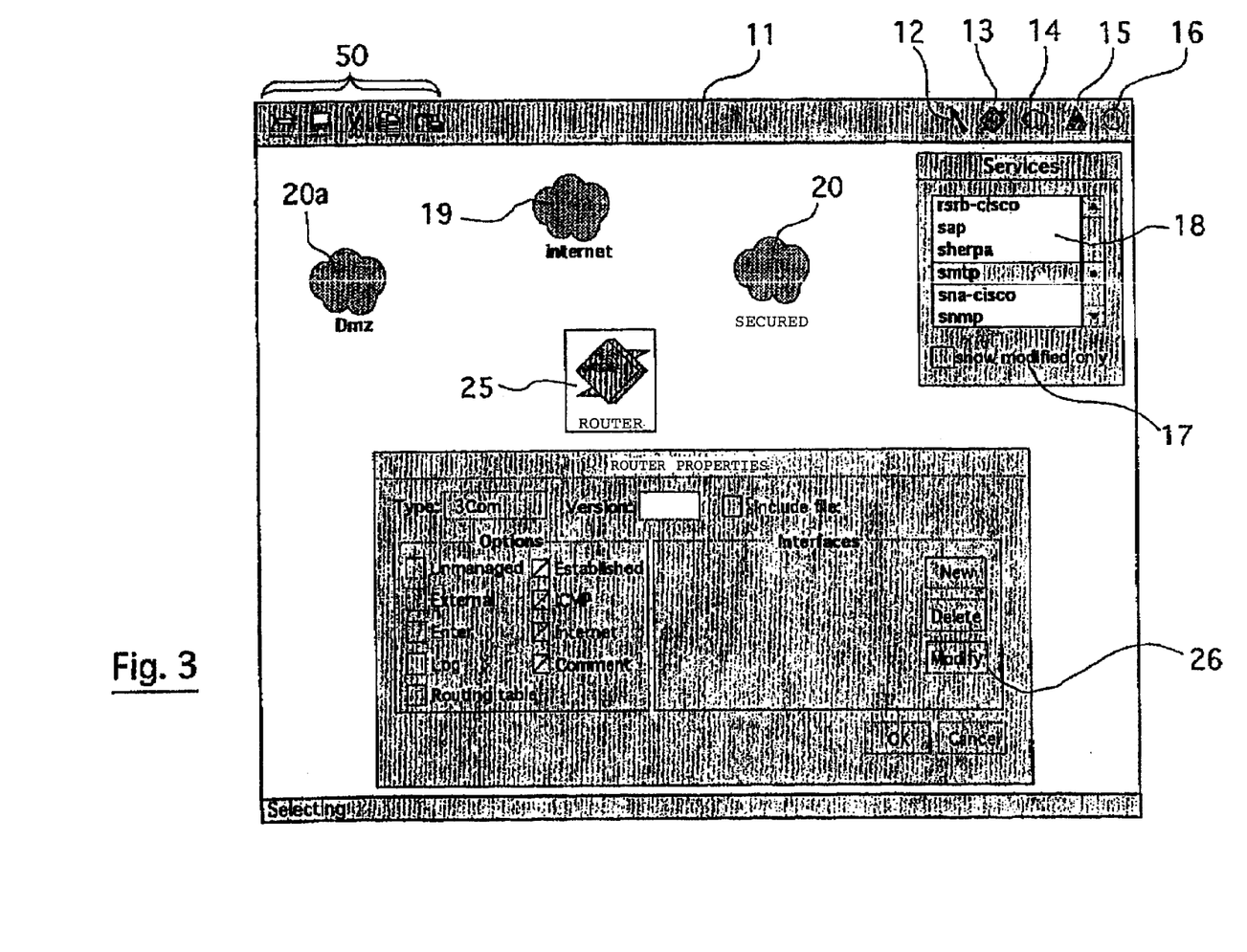
FIG. 3 shows the viewing screen during the phase of creating objects, and more particularly security domain routers.

We are now going to describe FIG. 3, which shows the viewing screen during the phase of creating objects, and more particularly security domain routers.

Figure 4:
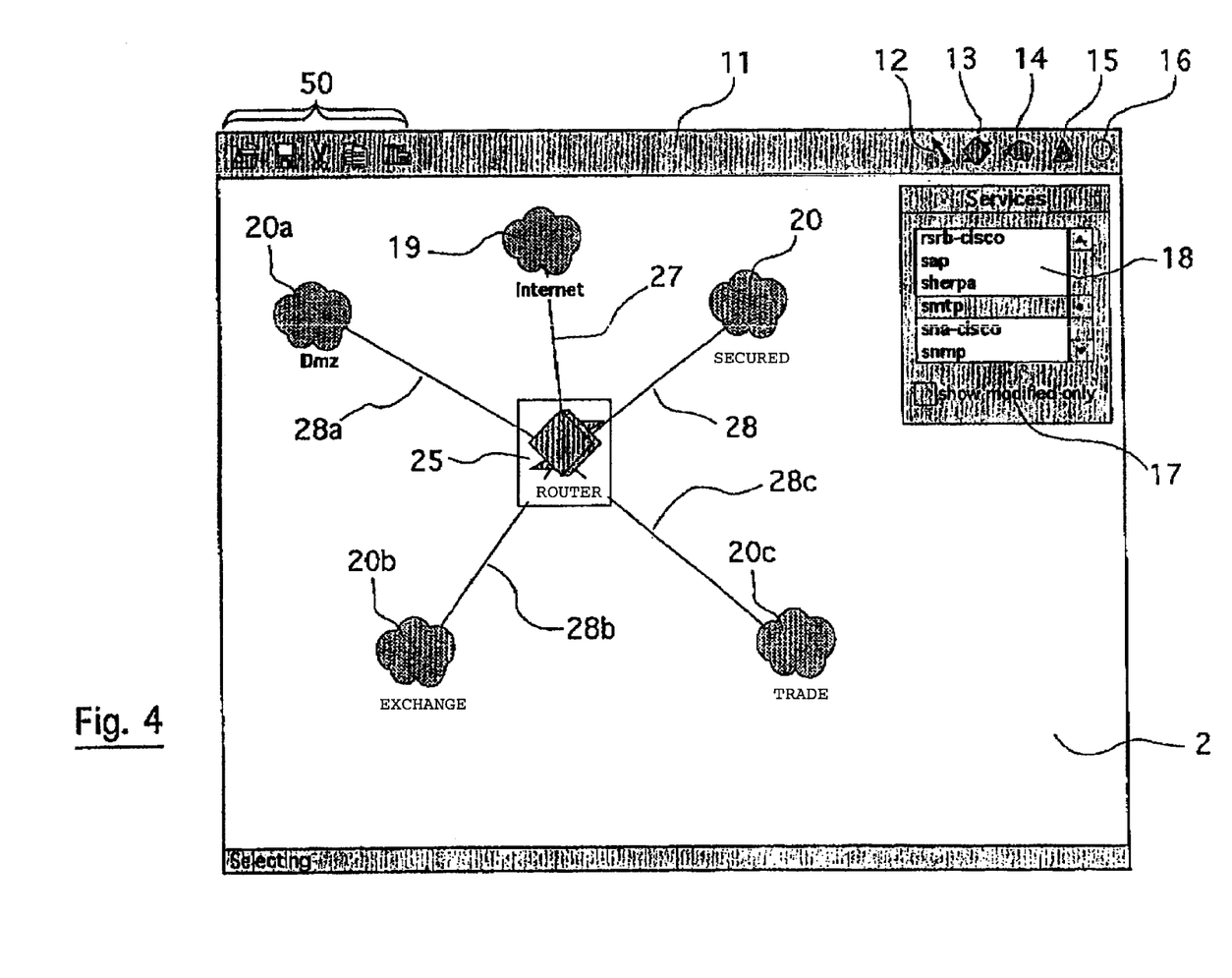
FIG. 4 shows the viewing screen when the links between objects have been specified (in the represented case, the router is interconnected through physical links with five networks).

In order to create the graphical representation of a router 25 at the graphical interface 2, the user uses the mouse 5 to activate icon 13 by means of cursor 6. The graphical representation of router 25 appears on viewing screen 2. By means of selection tool 12, the user can select, move and arrange router 25 to his liking at the graphical interface 2. In the example shown, router 25, labeled "router", has been selected. By operating control box 5, the user can open dialog windows 26 on screen 2, in order to input router properties, in particular the specifications thereof (the identification of the vendor or associated software) as well as the specifications (names) of the networks, with which the router is interfaced. The links or connections among the "Internet" 19, "Secured" 20, "Dmz" 20a, "Exchange" 20b, "Trade" 20c networks, and router 25 are represented at the graphical interface 2 by lines 27, 28, 28a, 28b, 28c (FIG. 4). The user proceeds iteratively to create the remaining routers and specify their links with the networks.

Figure 5:
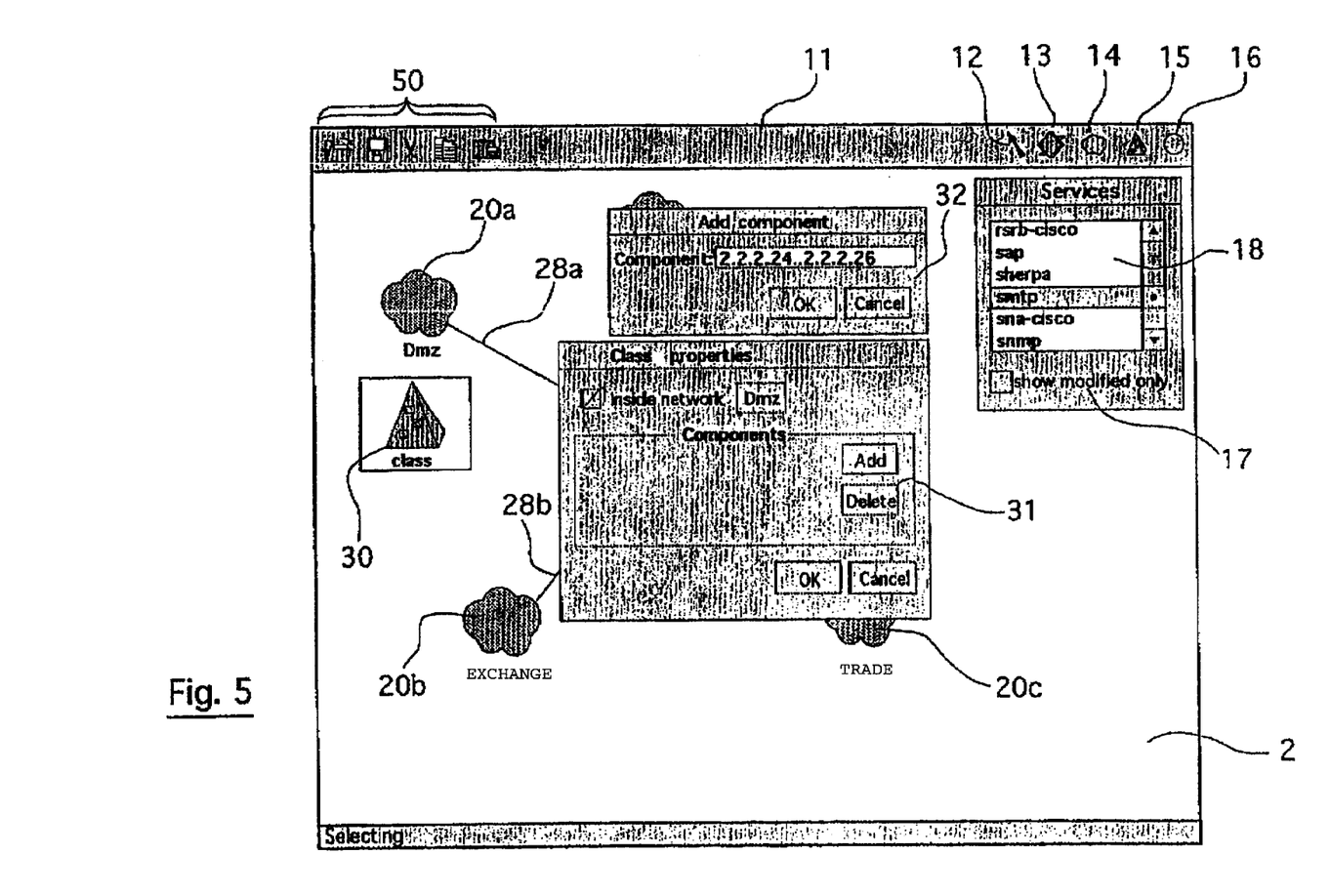
FIGS. 5 and 6 show the viewing screen during the phase of creating security domain classes.
Figure 6:
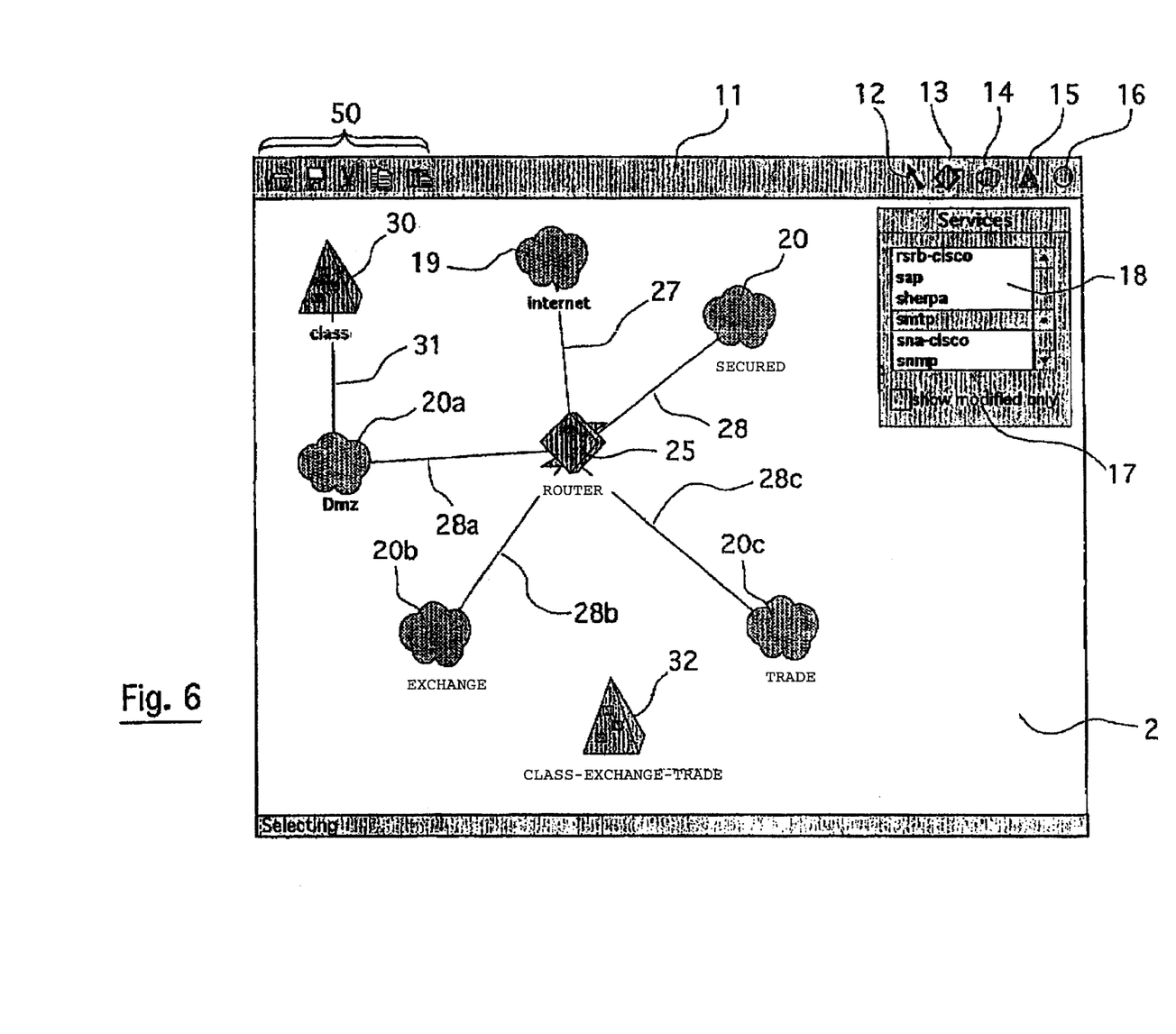

We are now going to describe FIGS. 5 and 6, which show the viewing screen during the phase of creating security domain classes.

In order to create the graphical representation of a class 30 at the graphical interface 2, the user uses the mouse 5 to activate icon 13 by means of cursor 6. The graphical representation of class 30 appears on viewing screen 2. By means of selection tool 12, the user can select, move and arrange class 30 to his liking at the graphical interface 2. In the example shown, class 30, labeled "class", has been selected. By operating control box 5, the user can open the dialog windows 31, 32 on screen 2, in order to input class properties, in particular the addresses of the "Dmz" network 20 belonging to "class" class 30. A pale gray line 31 allows to view that class 20a belongs to the "Dmz" network 20a (FIG. 6). Class 32, labeled "class-exchange-trade" has been specified so as to include the addresses of the "Exchange" network 20b and the addresses of the "Trade" network 20c. There is no line linking "class-exchange-trade" class 32 to the networks "Exchange" 20b and "Trade" 20c. Therefore, it is seen at the graphical interface 2 that class "class-exchange-trade" 32 gathers the objects present in the networks "Exchange" and "Trade". In the particular instance described, screen 2 of FIG. 6 shows the security domain as well as the objects (networks, router) and, classes of this security domain. The user proceeds iteratively to create the remaining classes and complete the security domain.

Figure 7:
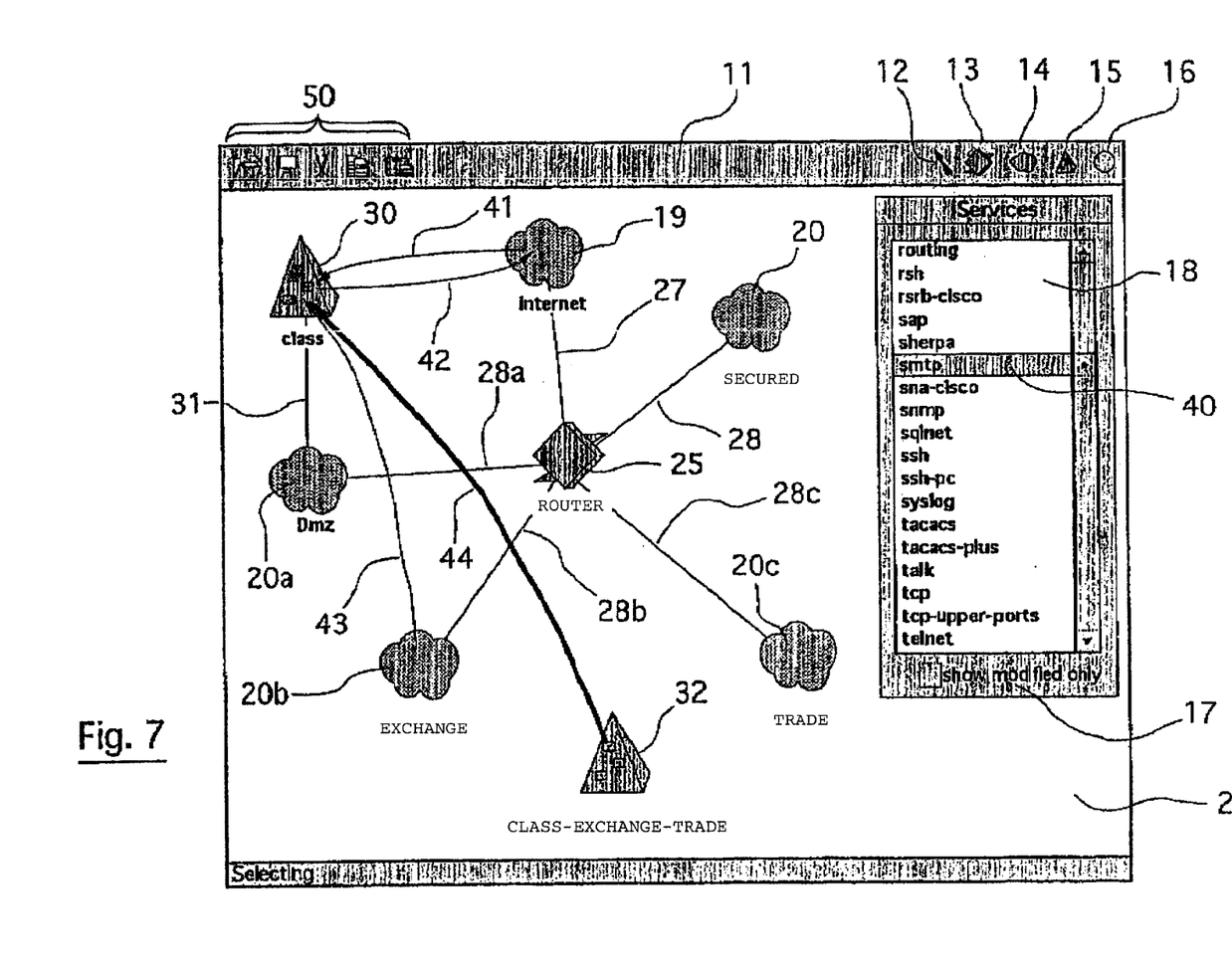
FIG. 7 shows the viewing screen during the phase of selecting application protocols and drawing laws of communication.

We are now going to describe FIG. 7, which shows the viewing screen during the phase of selecting application protocols and drawing laws of communication.

The user operates control box 5 to move cursor 6 and select, then activate the application protocol involved in the service (application protocol) window 18. The list of application protocols appearing in the service window 18 is proposed by default, the user has the possibility to add more. In the case described, the selected application protocol is the "smtp" protocol 40. By default, the "law of communication", i.e. the law enabling or disabling for the application protocol involved the communication between a pair of objects, a pair of classes or a mixed (class, object) pair is a disabling law. In order to define the security policy associated with the selected "smtp" application protocol 40, the user proceeds as will be described hereafter with reference to two specific cases.

In the first case, in order to implement an enabling law from the "Internet" network 19 to the "class" class 30, the user uses mouse 5 to activate icon 16 by means of cursor 6. Then, he specifies by means of a dialog window that this is an enabling law. Next, the user places cursor 6 on the "Internet" network 19, operates control box 5 to select the "Internet" network 19, moves cursor 6 from the "Internet" network 19 to the "class" class 30 and selects the latter. The green colored arrow line 41 is thus drawn at the graphical interface 2, the arrowhead pointing towards the "class" class 30. The user proceeds in the same way to implement an enabling law from the "class" class 30 to the "Internet" network 19. He thereby draws another green colored arrow line 42, the arrowhead pointing towards the "Internet" network 19. The user has thus viewed at the graphical interface that the computer equipment belonging to the "class" class 30 of the subset of the "Dmz" network 20a, can communicate bidirectionally with the objects of the "Internet" network 19.

In the second case, in order to implement an enabling law from the "Exchange" network 20b to the "class" class 30 and a disabling law from the "class-exchange-trade" class 32 to the "class" class 30, the user proceeds as previously, specifying by means of the dialog window the enabling and the disabling law. He thereby draws two arrow lines, one colored green 43, the other colored red 44. The user has thus viewed at the graphical interface that the computer equipment of the "Exchange" network 20b can communicate with the computer equipment subset of the "Dmz" network 20a, belonging to the "class" class 30, but that on the other hand, the computer equipment of the networks "Exchange" 20b and "Trade+ 20c belonging to the "class-exchange-trade" class 32 cannot communicate with the computer equipment subset of the "Dmz" network 20a, belonging to the "class" class 30. In case of conflicting laws, it is the disabling law that prevails vs. the enabling law.

The user proceeds iteratively to select the remaining application protocols and draw the laws of communication that are associated therewith.

Drawing such arrow curves representing the laws of communication allows to create simultaneously and instantly the creation of filters associated with filtering routers and applicable to the objects involved. For this purpose, the computing terminal 1 comprises a computing means la for converting the graphical data corresponding to the laws of communication into programming data of the filtering routers 8. The programming data is transferred to the computing terminal 1, via link 7, to filtering router 8, the filtering parameters of which are thus set automatically and quickly.

What is claimed is:

1. A method of graphically representing filters, according to internet protocol, intended to avoid risks of intrusion of interconnected computer networks; said method comprising implementation of a graphical interface (2) for, iteratively:

creating (13, 14, 15), viewing (2), and moving (5, 6, 12), at the graphical interface, objects (19, 20, 25, 30, 32), networks (19, 20), routers (25) and classes (30, 32) of a security domain, selecting (12) and viewing (18) application protocols (40) for which filters are to be created, and drawing (16), at the graphical interface (2), for each previously selected application protocol (40), laws of communication, by means of arrow curves (41, 42, 43, 44) linking the objects and/or classes of the security domain, so that drawing such arrow curves allows representation of the laws of communication of the security domain.

2. The method according to claim 1, so that in order to create the filters associated with the filtering routers (25) and applicable to the objects (20) involved, graphical data representing the laws of communication is converted into programming data of the filtering routers (8, 25).

3. The method according to claim 1, so that in order to modify a security policy of the security domain, the laws of communication (41, 42, 43, 44) between objects (20) or classes (30) are modified at the graphical interface (2), by selecting predetermined application protocols.

4. A system for graphically representing filter programming data, according to internet protocol, intended to avoid risks of intrusion of interconnected computer networks; said system comprising a graphical interface (2) associated with a computing terminal (1) and control means (4, 5) interacting iteratively with the graphical interface (2) for:

creating (13, 14, 15), viewing (2), and moving (5, 6, 12), at the graphical interface (2), objects, networks (19, 20), routers (20, 25), and classes (30) of a security domain, selecting (12) and viewing (18) application protocols (40) for which filters are to be created, and drawing (16), at the graphical interface (2), for each previously selected application protocol (40), laws of communication, by means of arrow curves (41, 42, 43, 44) linking the objects and/or classes of the security domain, so that drawing such arrow curves allows representation of the laws of communication of the security domain.

5. The system according to claim 4, so that in order to create the filters associated with the filtering routers (25) and applicable to the objects involved, the system comprises a computation means (1a) for:

converting graphical data representative of the laws of communication into programming data of the filtering routers (8, 25).

6. The system according to claim 4, so that in order to modify a security policy of the security domain, the control means (4, 5) comprises a means for selecting predetermined application protocols.

* * * * *